United States Patent
Stultz

[11] Patent Number: 5,687,186
[45] Date of Patent: Nov. 11, 1997

[54] EYESAFE LASER TRANSMITTER WITH SINGLE RESONATOR CAVITY FOR BOTH PUMP LASER AND OPTICAL PARAMETRIC OSCILLATOR

[75] Inventor: Robert D. Stultz, Bellflower, Calif.

[73] Assignee: Hughes Electronics, Los Angeles, Calif.

[21] Appl. No.: 646,200

[22] Filed: May 7, 1996

[51] Int. Cl.[6] .................................................. H01S 3/08
[52] U.S. Cl. .................... 372/92; 372/21; 372/93; 372/10; 372/99; 372/70; 359/328
[58] Field of Search .......................... 372/92, 99, 21, 372/10, 93, 70; 359/328

[56] References Cited

U.S. PATENT DOCUMENTS

| 5,390,211 | 2/1995 | Clark et al. | 372/92 |
| 5,457,707 | 10/1995 | Sobey et al. | 372/97 |

*Primary Examiner*—Leon Scott, Jr.
*Attorney, Agent, or Firm*—Gordon R. Lindeen, III; Michael W. Sales; Wanda K. Denson-Low

[57] ABSTRACT

An eyesafe laser (10) transmitter having a the optical parametric oscillator (28). A Nd:YAG rod (22) provides gain for light at a first wavelength. The light is Q-switched (24) to increase the intensity. The optical parametric oscillator (28) then transforms the light at the first wavelength to light at a second wavelength, where light at the second wavelength will not harm the eyes.

18 Claims, 2 Drawing Sheets

EYESAFE LASER TRANSMITTER WITH SINGLE RESONATOR CAVITY FOR BOTH PUMP LASER AND OPTICAL PARAMETRIC OSCILLATOR

BACKGROUND OF THE INVENTION

1. Field of the Invention

This invention relates to laser systems which shift the wavelength of light emitted by the laser and, more particularly, to a laser system which utilizes the same optical resonator cavity for both the pump laser and the optical parametric oscillator.

2. Discussion

Eyesafe laser transmitters of the type discussed herein typically include two resonator cavities. A first resonator cavity operates in conjunction with the pump, and a second resonator cavity operates in conjunction with the optical parametric oscillator (OPO). The two-resonator configuration requires a total of three resonator mirrors for operation of the laser. The use of three resonator mirrors significantly complicates alignment of the mirrors.

In addition to alignment considerations, typical eyesafe lasers include a relatively short OPO cavity which results in high Fresnel numbers, thereby reducing the overall quality of the laser beam. Further, the spatial overlap of these cavities is often significantly limited by the present arrangements.

Therefore, it is an object of the present invention to provide an improved laser system.

It is a further object of the present invention to provide a laser system which uses the same optical cavity for the pump laser and the optical parametric oscillator.

It is still a further object of the present invention to provide a laser system which requires only two resonator mirrors to operate the eyesafe laser transmitter.

It is still a further object of the present invention to provide a laser system which simplifies optical alignment of the two mirrors in the eyesafe laser.

It is still a further object of the present invention to provide a laser system having a generally longer optical parametric oscillator cavity, thereby providing improved output beam quality.

It is still a further object of the present invention to provide a laser system having improved spatial overlap of the pump and optical parametric oscillator cavity modes.

SUMMARY OF THE INVENTION

According to the present invention, a laser comprises a resonator cavity having a reflective surface on at least one end for partially reflecting light of a first wavelength within the resonator cavity and for partially reflecting light of a second wavelength within the resonator cavity. A pump is disposed within the resonator cavity for supplying light at a pumping frequency to the laser medium. An optical parametric oscillator disposed within the resonator cavity converts the light at the pumping frequency to light at an output frequency. Further, the optical parametric oscillator and the pump both are housed within the resonator cavity, and the resonator, the pump, and the optical parametric oscillator are optically aligned.

Additional objects, features and advantages of the present invention will become apparent from the following description and the appended claims, taken in connection with the accompanying drawings.

DETAILED DESCRIPTION OF A PREFERRED EMBODIMENT

Figure 1:
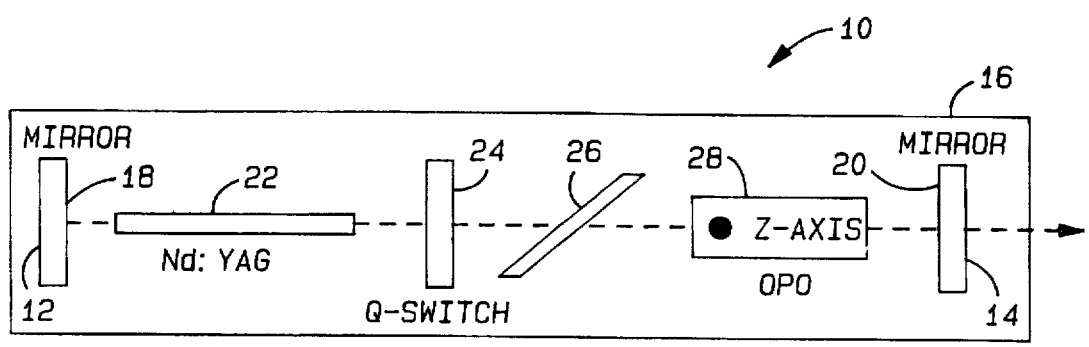
FIG. 1 is a laser system arranged in accordance with the principles of the present invention.

In FIG. 1, the laser system 10 includes a first mirror 12 and a second mirror 14 defining the ends of an optical cavity 16. Mirror 12 includes an interior surface 18 which is high-reflectivity coated (approximately 100%) to reflect light having a wavelength of 1.06 microns and approximately 88% reflectivity coated to reflect light having a wavelength of 1.57 microns. Mirror 14 includes an interior surface 20 which is high-reflectivity coated (approximately 100%) to reflect light having a wavelength of 1.06 microns and partially reflectivity coated at 70% to reflect light having a wavelength of 1.57 microns. The reflectivity coating of interior surfaces 18 and 20 of mirrors 12 and 14, respectively, coincides with the wavelengths of light emitted by the pump (1.06 microns) and the optical parametric oscillator 28 (1.57 microns). Mirrors 14 and 12 are preferably separated by approximately 14 centimeters. While shown as being 88% reflective of 1.57 microns, mirror 12 preferably is 100% reflective of 1.57 micron light. Further, all other components of the resonator cavity 16 are typically anti-reflective coated to absorb light at both 1.06 microns and 1.57 microns.

Within the interior of the resonator cavity 16 a neodymium-doped yttrium aluminum garnet (Nd:YAG) rod 22 of dimensions 2.5 millimeters×50 millimeters is flashlamp-pumped. Preferably both the rod 22 and the lamp are enclosed within a reflective ceramic pump cavity. The rod 22 provides gain for light at a wavelength of 1.06 microns. The Q-switch 24 initially absorbs light at 1.06 microns until a predetermined amount of energy has been absorbed. Q-switch 24 then becomes relatively transparent, thereby resulting in the onset of laser action and subsequently causing the release of stored energy as 1.06 micron light. The Brewster plate 26 causes the 1.06 micron light to be linearly polarized. The polarized 1.06 micron light, after reaching sufficient intensity, is converted to 1.57 micron light by the optical parametric oscillator (OPO) 28. The OPO 28 includes as the active element a potassium titanyl phosphate (KTP) crystal having its Z-axis shown as projecting outward from the plane of FIG. 1. This KTP crystal orientation, as well as the orientation of the Brewster plate, were predetermined to meet type II phase matching conditions for KTP, i.e., the 1.06 micron and 1.57 micron light are linearly polarized perpendicular to the Z-axis of the KTP. Thus, it can be seen from FIG. 1 that the optical parametric oscillator 28 and Nd:YAG rod 22 share a common resonator cavity 16. It will be noted by one skilled in the art that the reflective coatings applied to interior surface 20 of mirror 14 may be applied to the output side of OPO 28, thereby eliminating mirror In operation, the Nd:YAG rod 22 is flashlamp-pumped or diode-pumped. The 1.06 micron light is Q-switched using a 0.5 optical density (low intensity transmittance) tetravalent-doped chromium yttrium aluminum garnet ($Cr^{4+}$:YAG) crystal. The threshold for the laser in FIG. 1, using this Q-switch, is about 3.6 joules of electrical energy input to the flashlamp. In the embodiment described in FIG. 1, approximately 1.2 millijoules of output energy emitted from mirror 14, while approximately 0.4 millijoules of output energy in the form of 1.57 micron light is emitted from mirror 12. Further, the surface coatings of Nd:YAG and Cr:YAG were anti-reflective coated at 1.064 microns but not at 1.57 microns.

Figure 2:
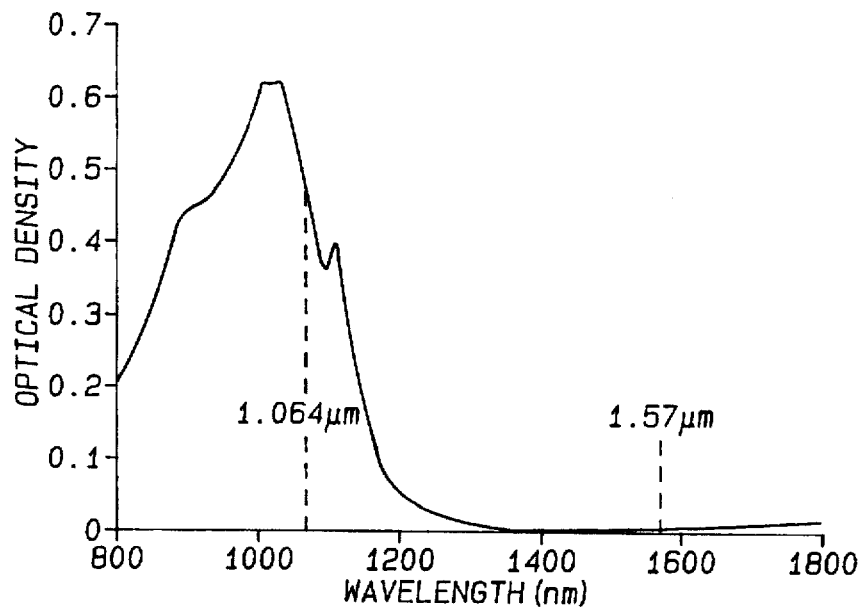
FIG. 2 is a plot of the absorption spectrum of the Q-switch shown in FIG. 1.
Figure 3:
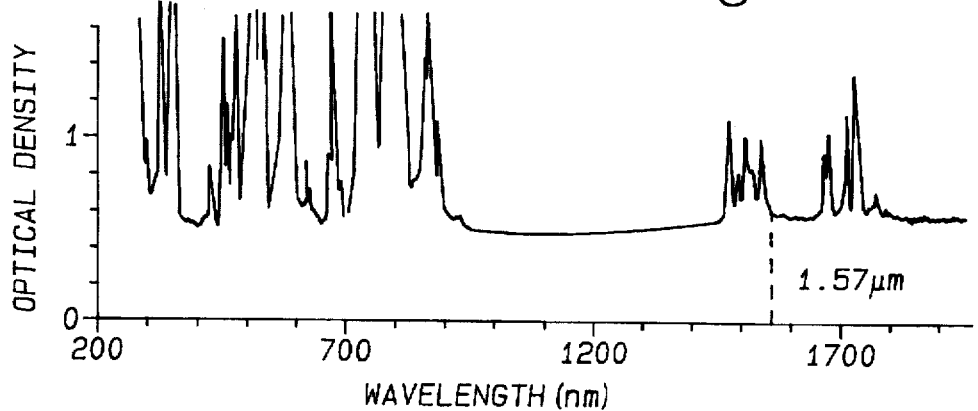
FIG. 3 is a plot of the absorption spectrum of the Nd:YAG.

The low intrinsic losses of both the $Cr^{4+}$:YAG and $Nd^+$:YAG at the optical parametric oscillator signal wavelength can be seen in the absorption spectra of FIGS. 2 and 3, respectively. Of particular importance with respect to FIGS. 2 and 3 is the relatively low loss at the 1.57 micron wavelength in both the $Cr^{4+}$:YAG and $Nd^+$:YAG crystals.

Figure 4:
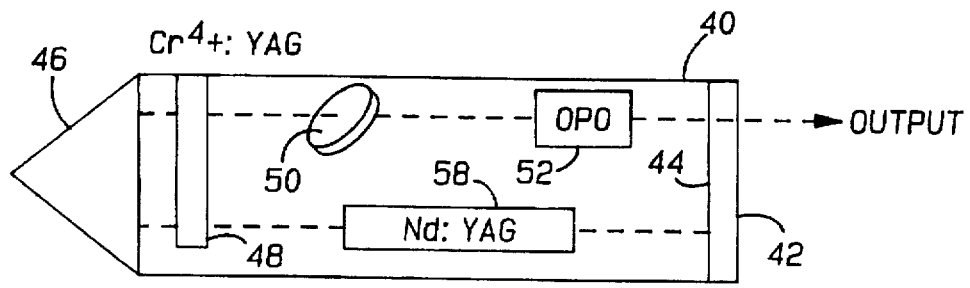
FIG. 4 is a second embodiment of the laser arranged in accordance with the principles of the present invention.
Figure 5:
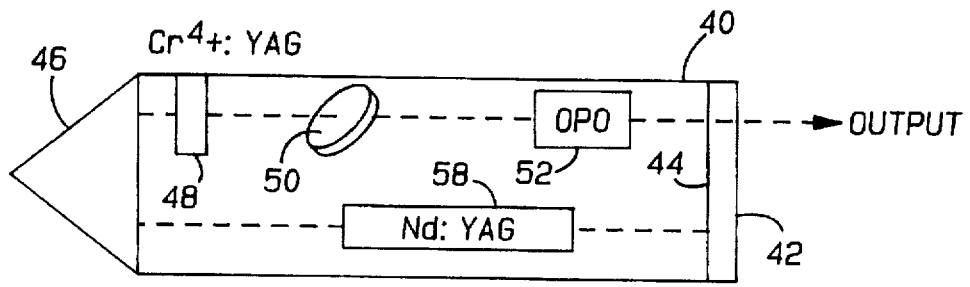
FIG. 5 is yet another embodiment of the laser arranged in accordance with the principles of the present invention.
Figure 6:
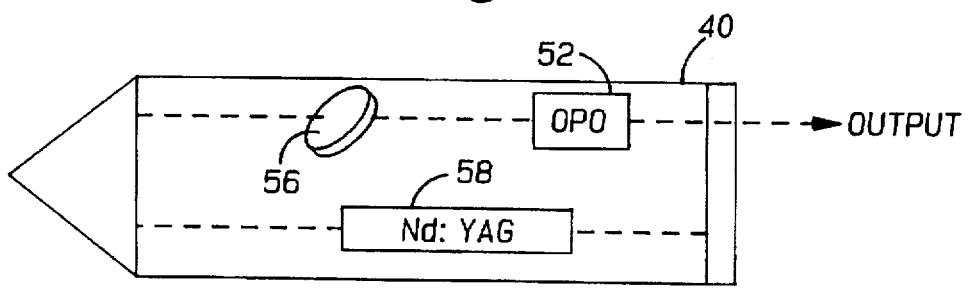
FIG. 6 is yet a further embodiment of the laser arranged in accordance with the principles of the present invention.

FIGS. 4–6 depict alternative embodiments of the eyesafe laser which utilizes the single optical cavity concept. Referring to FIG. 4, the resonator cavity 40 includes a single mirror 42 having deposited on an interior surface 44 a high reflectivity mirror coating to totally reflect light at a wavelength of 1.06 microns and to partially reflect light at a wavelength of 1.57 microns. The resonator cavity 40 also includes a corner cube or folding prism 46, which enables a single mirror design. The Q-switch 48 comprising a $Cr^{4+}$:YAG crystal extending across both legs of the folded resonator cavity 40. The Nd:YAG rod 58 is flashlamp-pumped. The rod 22 provides gain for light at a wavelength of 1.06 microns. Q-switch 48 operates as described with respect to FIG. 1 to absorb light at 1.06 microns, then release the stored energy subsequent to the onset of laser action. The Brewster plate 50 causes the 1.06 micron light to be linearly polarized. OPO 52 includes a KTP crystal and converts the 1.06 micron light, after it reaches a sufficient intensity, to 1.57 micron light. The 1.57 micron light is then partially transmitted through the mirror 42 to provide an output laser beam. A particular advantage realized by the folded resonator 40 of FIG. 4 is that the resonator may be optically aligned prior to insertion of the Q-switch 48. That is, inserting the Q-switch does not disturb the alignment of the folded resonator configuration 40.

FIG. 5 is arranged similarly to that of FIG. 4 and like elements will be referred to using like reference numerals. FIG. 5 includes the same elements as described with respect to FIG. 4 except note that in FIG. 5, the Q-switch 48 extends only across one leg of the folded resonator cavity 40. FIG. 6 depicts a folding resonator cavity 40 arranged similarly to that described in FIGS. 4 and 5. FIG. 6 further includes a combined Q-switch and Brewster plate 56 which performs the dual function of increasing the intensity of and polarizing light at 1.06 microns.

Figure 7:
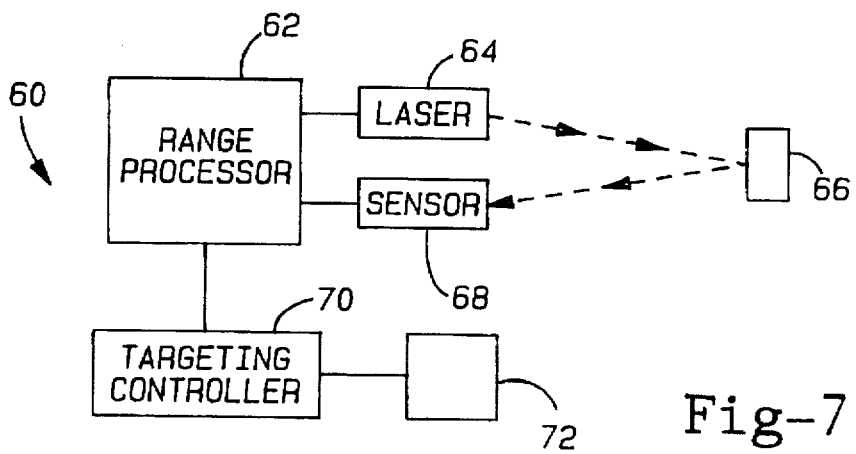
FIG. 7 is a block diagram for a range processing system using the laser described in the present invention.

With reference to FIG. 7, a targeting system 60 is shown which includes one of the laser as described in FIGS. 1 and 4–6. The targeting system 60 includes a range processor 62. Range processor 62 provides control signals to a laser 64, which may be any of the lasers as described with respect to FIGS. 1 and 4–6. The laser 64 outputs a single (or repeated) pulse directed to an object 66 which has been selected for targeting. The laser pulse reflects off of object 66 back in the direction of the laser 64. A sensor 68 detects the reflected pulse. The sensor 68 provides an input signal to range processor 62. Range processor 62 then determines the distance between the laser 64/sensor 68 and the object 66.

Range processor 62 determines the distance in accordance with the time differential between the sending of the pulse by laser 64 and the receiving of the pulse by sensor 68. Range processor 62 then computes the distance and outputs the distance to targeting controlling 70. Targeting controller 70 then determines a targeting solution in accordance with the distance provided by range processor 62 and other inputs (not shown). Targeting controller then outputs the targeting solution to a tracking device 72 whose orientation may be controlled by targeting controller 70 in accordance with the range information provided by range processor 62.

Several important aspects of the invention will now be discussed.

1. It will be noted by one skilled in the art, that with respect to FIG. 1, mirrors 12 and 14, resonator cavity 16, and Nd:YAG rod 22 define a laser pump. The Nd:YAG rod provides the gain medium for the pump laser. Q-switch 24 may optionally also be included as part of the pump laser. Similarly, it will be understood by one skilled in the art that when a mirror coating is applied to the output side of the OPO, that mirror coating also comprises part of the pump laser.

2. It will further be understood by those skilled in the art that materials other than Nd:YAG may be substituted therefor. For example, either of the materials yttrium orthovanadate ($Nd_3$:$YVO_4$) or YLF ($Nd^{3+}$:$LiYS_4$) may be readily substituted for the Nd:YAG rod. These materials provide properties differing from the Nd:YAG which may be attractive in particular applications of the invention. In general, the rod may include one of the following materials Nd, $Nd^{3+}$, and $Yb^{3+}$.

3. Similarly, with respect to the OPO, other nonlinear crystals may be substituted for the KTP crystal. Examples of acceptable substitutes may include potassium titanyl arsenate (KTA), rubidium titanyl arsenate (RTA), potassium rubidium titanyl arsenate (KRTA), and the like. These various crystals generally share the common property that they can shift an incoming wavelength to an eyesafe, typically 1 to 1-1½ microns, in a non-critically matched phase condition but having a selection of crystals available provides greater flexibility in the design of lasers for particular applications.

4. Further, as stated above with respect to FIG. 1, diode-pumping of the pump laser may be used as an alternative to the flash lamp-pumping, as described.

From the foregoing, it can be seen that the configuration of the present invention which uses the same optical resonator cavity for both the pump laser and the optical parametric oscillator, provides a much simpler configuration. The simpler configuration eliminates a resonator mirror, which in turn significantly simplifies optical alignment of the device. The simplified optical alignment also provides for a much longer optical parametric oscillator cavity, which ultimately results is better spacial overlap of the pump and OPO cavity modes, thereby providing an improved laser output.

Although the invention has been described with particular reference to certain preferred embodiments thereof, variations and modifications can be effected within the spirit and scope of the following claims.

What is claimed is:

1. A laser comprising:
    a resonator cavity having a reflective surface on at least one end for at least partially reflecting light of a first wavelength within the resonator cavity and for partially reflecting light of a second wavelength within the resonator cavity;

a pump laser disposed within the resonator cavity for supplying light at a pumping frequency to the laser cavity; and an optical parametric oscillator disposed within the resonator cavity for converting the light at the pumping frequency to light at an output frequency, wherein the optical parametric oscillator and the pump laser both are housed within the resonator cavity, and the resonator, the pump laser, and the optical parametric oscillator are optically aligned.

2. The laser as defined in claim 1 further comprising a Q-switch in optical alignment with the pump laser for increasing the intensity of light at the pumping frequency.

3. The laser as defined in claim 1 further comprising a filter in optical alignment with the pump laser for polarizing the light at the pumping frequency into a planar alignment suitable for the operation with the optical parametric oscillator.

4. The laser as defined in claim 1 further comprising a second mirror at a second end of the resonator cavity and opposing the first mirror, the second mirror being at least partially reflective of light at the pumping frequency and at least partially reflective of light at the output frequency of the laser.

5. The laser as defined in claim 1 further comprising:

a Q-switch in optical alignment with the pump laser for increasing the intensity of light at the pumping frequency;

a filter in optical alignment with the laser medium for polarizing the light at the pumping frequency into a planar alignment suitable for the operation with the optical parametric oscillator; and a second mirror at a second end of the resonator cavity and opposing the first mirror, the second mirror being at least partially reflective of light at the pumping frequency and at least partially reflective of light at the output frequency of the laser.

6. The laser as defined in claim 5 wherein the pump laser includes a rod comprised of one of the group of Nd:YAG, $Nd^{3+}:YVO_4$, and $Nd^{3+}:LiYF_4$.

7. The laser as defined in claim 5 wherein the pump laser includes a rod formed with one of the group of materials comprising $Nd^{3+}$ and $Yb^{3+}$.

8. The laser as defined in claim 5 wherein the Q-switch includes $Cr^{4+}$ and a host material.

9. The laser as defined in claim 5 wherein the optical parametric oscillator includes a crystal comprised one of the group of a KTP, RTA, KRTA crystal.

10. The laser as defined in claim 5 wherein to optical parametric oscillator includes a crystal including a material that can shift an incoming wavelength to an eyesafe wavelength in a non-critically matched condition.

11. The laser as defined in claim 5 wherein the first mirror further comprises a reflective surface applied to the optical parametric oscillator nonlinear crystal.

12. The laser as defined in claim 1 wherein the resonator cavity is a folded resonator cavity and a corner cube is located opposite the first mirror at a second end of the resonator cavity.

13. A laser comprising:

a resonator cavity defining a common optical path;

a first mirror disposed at one end of the resonator cavity along the optical path and reflecting light at a pumping and an output frequency towards the interior of the resonator cavity;

a second mirror disposed at an opposite end of the resonator cavity from the first mirror along the optical path and reflecting light of at the pumping frequency toward the interior of the resonator and partially reflecting light at the output frequency toward the interior of the resonator cavity;

a pump laser disposed within the within the resonator cavity along the optical path for supplying light at the pumping frequency;

a Q-switch disposed along the optical path for increasing the intensity of light at the pumping frequency;

a filter disposed along the optical path for polarizing light into a planar alignment;

an optical parametric oscillator disposed within the resonator cavity along the optical path for converting the polarized light at the pumping frequency to light at the output frequency, wherein the optical parametric oscillator and the pump both are housed within the resonator cavity.

14. The laser as defined in claim 13 wherein the light at the pumping frequency has a wavelength in the range of 1.00 microns to 1.20 microns and the output frequency is in the range of 1.5 microns to 1.8 microns.

15. The laser as defined in claim 13 wherein the first mirror is attached to optical parametric oscillator nonlinear crystal.

16. A laser comprising:

a resonator cavity defining a common optical path;

a first mirror disposed at one end of the resonator cavity along the optical path and reflecting light at a pumping frequency toward the interior of the resonator cavity and partially reflecting light at an output frequency toward the interior of the resonator cavity;

a corner cube disposed at an opposite end of the resonator cavity from the first mirror along the optical path for redirecting light in the directing of the first mirror;

a pump laser disposed within the resonator cavity along the optical path for supplying light at the pumping frequency;

a Q-switch disposed along the optical path for increasing the intensity of light at the pumping frequency;

a filter disposed along the optical path for polarizing light into a planar alignment;

an optical parametric oscillator disposed within the resonator cavity along the optical path for converting light at the pumping frequency to light at the output frequency, wherein the optical parametric oscillator and the pump laser both are housed within the resonator cavity.

17. The laser as defined in claim 16 wherein the Q-switch intersects light incident to and reflecting from the corner cube.

18. The laser as defined in claim 16 wherein the Q-switch and filter are integrally combined.

* * * * *